US012709683B2

(12) United States Patent
Hechtl

(10) Patent No.: US 12,709,683 B2
(45) Date of Patent: Aug. 18, 2026

(54) IMPRESGNATION CREAM, USE AND METHOD FOR PREPARING THE IMPREGNATION CREAM

(71) Applicant: Wolfgang Hechtl, Burghausen (DE)

(72) Inventor: Wolfgang Hechtl, Burghausen (DE)

( * ) Notice: Subject to any disclaimer, the term of this patent is extended or adjusted under 35 U.S.C. 154(b) by 814 days.

(21) Appl. No.: 17/562,188

(22) Filed: Dec. 27, 2021

(65) Prior Publication Data

US 2023/0087972 A1 Mar. 23, 2023

(30) Foreign Application Priority Data

Sep. 22, 2021 (DE) ........................ 102021124578.8

(51) Int. Cl.

*C08L 83/06* (2006.01)
*C04B 41/49* (2006.01)
*C09D 183/06* (2006.01)

(52) U.S. Cl.

CPC .......... *C08L 83/06* (2013.01); *C04B 41/4961* (2013.01); *C04B 41/4966* (2013.01); *C09D 183/06* (2013.01)

(58) Field of Classification Search

CPC ....... C08L 83/04; C08L 83/06; C09D 183/04; C09D 183/06; C08J 2383/04; C08J 2383/06; C08J 3/03; C04B 41/4961; C04B 41/4966

See application file for complete search history.

(56) References Cited

U.S. PATENT DOCUMENTS

| | | | | |
|---|---|---|---|---|
| 3,634,285 | A * | 1/1972 | Brooks | C10M 3/00 516/57 |
| 4,476,282 | A * | 10/1984 | Koerner | C08G 77/06 524/588 |
| 4,726,848 | A * | 2/1988 | Murphy | C09D 9/005 510/202 |
| 5,962,585 | A | 10/1999 | Mayer et al. | |

FOREIGN PATENT DOCUMENTS

| | | | |
|---|---|---|---|
| DE | 19628035 | A1 | 1/1998 |
| DE | 19945305 | A1 | 1/2001 |
| JP | H04178429 | A | 6/1992 |
| JP | H11293110 | A | 10/1999 |
| JP | 2003073546 | A | 3/2003 |
| JP | 2005298689 | A | 10/2005 |
| JP | 2012052053 | A | 3/2012 |
| JP | 2013504670 | A | 2/2013 |

OTHER PUBLICATIONS

Gelest, Silicone Fluids: Stable, Inert Media (Year: 2013).*
Scifinder properties of CAS 42557-10-8 (Year: 2024).*
Extended European Search Report for European Application No. 21208196.2, dated May 3, 2022, 5 Pages.
International Preliminary Report on Patentability for International Application No. PCT/EP2021/080391, dated Apr. 4, 2024, 12 Pages.
International Search Report and Written Opinion for International Application No. PCT/EP2021/080391, dated Jun. 20, 2022, 15 Pages.
Decision to Refusal for Japanese Application No. 2024-517067, dated Mar. 24, 2026, 5 Pages.
Notice of Reasons for Refusal for Japanese Application No. 2024-517067, dated Oct. 21, 2025, 6 Pages.
Notice of Reasons for Refusal for Japanese Application No. 2024-517067, dated Apr. 22, 2025, 09 Pages.

* cited by examiner

*Primary Examiner* — Kregg T Brooks
(74) *Attorney, Agent, or Firm* — Meunier Carlin & Curfman LLC

(57) ABSTRACT

The invention relates to an impregnation cream. The impregnation cream contains water, at least one emulsifier and at least one polydimethylsiloxane selected from: HO—$(SiMe_2O)_n$—H and $Me_3SiO$—$(SiMe_2O)_n$—$SiMe_3$, wherein n is an integer from 20 to 2500, wherein the impregnation cream is free of hydrocarbons, alkoxylated silanes, alkoxylated siloxanes and amine group-functionalized siloxanes.

8 Claims, No Drawings

IMPREGNATION CREAM, USE AND METHOD FOR PREPARING THE IMPREGNATION CREAM

The invention relates to an impregnation cream for hydrophobization of building materials and a method for the production of the same. Moreover, use of an impregnation cream is part of the invention.

From the prior art, impregnation creams for the protection of building structures against moisture are known. For example, DE 19945305 A1 describes an impregnation cream having a specified active silane/siloxane ingredient content, which contains water, an emulsifier and an organosilicon compound. As another essential raw material, this impregnation cream contains a hydrocarbon component which is added to reduce the active ingredient content of the impregnation cream to make the impregnation cream more workable. A disadvantage of hydrocarbon-containing impregnation creams is difficult stabilization thereof caused by the hydrophobic hydrocarbon content. Furthermore, an impregnation cream comprising alkoxylated silanes and amino group-functionalized organopolysiloxanes is known from DE 19628035 A1. In this case, a high proportion of alkoxylated silanes and amino group-functionalized organopolysiloxanes is required, but they are not very environmentally friendly or user-friendly due to their alkoxylation or amino group functionalization. Moreover, impregnation creams are more hard to prepare, keep on stock and process when they comprise a plurality of components, as disclosed in the foregoing prior art.

Therefore, it is an object of the present invention to provide an impregnation cream characterized by a simplified composition while exhibiting excellent hydrophobic properties. Furthermore, it is also an object of the present invention to provide a simple and inexpensive method for producing such an impregnation cream, as well as a use of the impregnation cream.

These objects will be fulfilled by the subject matter of the independent claims. Advantageous further developments and embodiments of the invention are contained in the subclaims.

Accordingly, the problem will be solved by providing an impregnation cream comprising water, at least one emulsifier and at least one polydimethylsiloxane.

The polydimethylsiloxane is selected from the group consisting of polydimethylsiloxanes of the following formulae, wherein n is an integer from 20 to 2500:

$$HO—(SiMe_2O)_n—H \text{ and } Me_3SiO—(SiMe_2O)_n—SiMe_3$$

The polydimethylsiloxanes used according to the invention can each be used individually or in any combination. Among appropriate combinations are those comprising both hydroxyl-terminated polydimethylsiloxanes and trimethylsilyl-terminated polydimethylsiloxanes. The polydimethylsiloxanes can be used depending on the desired viscosity.

Due to their hydrophobic nature, the polydimethylsiloxanes according to the invention, on the one hand, are well suited for hydrophobization of mineral building materials, but on the other hand also exhibit better user compatibility and environmental friendliness than siloxanes used in prior art. It was found that it is advantageous for the siloxanes used not to have any alkoxyl groups themselves, as this would lead to a high proportion of alkoxylated products due to the amount used, which can thus be effectively avoided.

Nevertheless, use of an emulsifier, which is preferably an alkoxylated emulsifier having an HLB (hydrophilic-lipophilic balance) value of at least 9, as shown below, allowed to achieve very good stability of the impregnation cream, which has a simple structure and consists of only a few components. While alkoxylation of the preferably used emulsifier introduces a certain amount of alkoxy groups into the impregnation cream, the proportion of emulsifier is usually significantly lower than the proportion of polydimethylsiloxane, so that in total the proportion of alkoxy groups in the impregnation cream will be reduced even when an alkoxylated emulsifier is used, compared with conventional impregnation creams. Use of an alkoxylated emulsifier is particularly advantageous because it leads to particularly high stability of the impregnation cream, and the polydimethylsiloxanes used according to the invention remain permanently stable and homogeneously distributed in the impregnation cream, resulting in uniform distribution of the hydrophobic agent polydimethylsiloxane after application of the impregnation cream to a substrate to be hydrophobized.

Furthermore, according to the invention, the impregnation cream is free of hydrocarbons, alkoxylated silanes, alkoxylated siloxanes and amine group-functionalized siloxanes.

In this context, "hydrocarbons" are understood to mean all types of hydrocarbons, aliphatic (straight-chain or branched) as well as aromatic hydrocarbons. These also include especially kerosenes and isoparaffins, which, according to the invention, will be eliminated for reasons of better stability of the impregnation cream and simplified processing and manufacturability.

"Alkoxylated silanes", in this context, are silanes which have one or more alkoxy groups, such as alkylalkoxysilanes, ethoxylated silanes and the like.

"Alkoxylated siloxanes", in this context, are siloxanes having one or more alkoxy groups, such as alkylalkoxysiloxanes, ethoxylated dialkylsiloxanes, and the like. By definition, siloxanes include polymers of the siloxanes.

"Amine group-functionalized siloxanes" include any siloxanes having one or more amino groups, such as aminopropyl group-functionalized siloxanes. By definition, siloxanes include polymers of the siloxanes.

By eliminating the above-mentioned raw materials, the composition of the impregnation cream according to the invention can be simplified while retaining excellent hydrophobic properties. In addition, this also simplifies production of the impregnation cream, while still obtaining an impregnation cream with very good application properties, good stability and rain resistance.

To further simplify the composition of the impregnation cream, it consists of water, at least one emulsifier and at least one polydimethylsiloxane selected from:

$$HO—(SiMe_2O)_n—H \text{ and } Me_3SiO—(SiMe_2O)_n—SiMe_3$$

wherein n is an integer from 20 to 2500. Optionally, at least one additive may further be included, wherein a total amount of the additives, based on the total mass of the impregnation cream is less than 5% by mass and especially less than 3% by mass. If several additives are used in combination, the quantities indicated apply to the total of all additives.

According to the present invention, additives are auxiliary substances that do not impair the effect of the impregnation cream, i.e. hydrophobicity thereof. Exemplary additives include antioxidants and preservatives.

As described above, the emulsifier is preferably an alkoxylated emulsifier having an HLB value of at least 9. By using an alkoxylated emulsifier, excellent stability of the simple-structured impregnation cream consisting of only few components can be achieved. By stability the unchanged, stable consistency of the impregnation cream after long storage time at room temperature, after which separation of a liquid phase is not detectable, is meant. The polydimethylsiloxanes used according to the invention remain permanently stable and homogeneously distributed in the impregnation cream, resulting in uniform distribution of the hydrophobic agent polydimethylsiloxane following application of the impregnation cream to a substrate to be hydrophobized.

To further improve the stability of the impregnation cream, the emulsifier preferably has an HLB value of at least 10 and especially at least 12. The higher the HLB value of the emulsifier, the more hydrophilic the emulsifier. Although the polydimethylsiloxane used according to the invention is characterized by a high hydrophobicity, it was found that, presumably due to formation of strong hydrogen bonds, a "network" stabilizing the polydimethylsiloxane very well can be generated in the impregnation cream, so that the polydimethylsiloxane remains homogeneously distributed in the impregnation cream even after a longer standing time, and thus also retains its very good application properties.

Isotridecyl alcohol polyglycol ether having an HLB value of 13, which is also available as a polyethylene glycol monoalkyl ether or oligoethylene glycol monoalkyl ether under CAS number 9043-30-5, has proven to be a particularly efficient emulsifier.

By reducing the amount of emulsifier, user-friendliness and environmental friendliness of the impregnation cream can further be improved. Particularly advantageously, an amount of the emulsifier, based on the total mass of the impregnation cream, is 0.3 to 3 mass %, especially 0.4 to 2 mass % and especially 0.5 to 1 mass %. If two or more emulsifiers are used in combination, the amounts given herein refer to the total of all emulsifiers. Even very low amounts of 0.3 mass % have been found to be effective in stabilizing the impregnation cream due to the high hydrophilicity and alkoxylated structure. Amounts above 3 mass %, essentially do not show further increase in stability. For reasons of economy, user-friendliness and environmental friendliness, the preferred amounts of emulsifier are in a range from 0.4 to 2 mass % and especially from 0.5 to 1 mass %.

Still advantageously, the degree of polymerization n of the polydimethylsiloxanes shown above is an integer from 50 to 1800. This raises the viscosity of the polydimethylsiloxane to a very workable range or limits it thereto, so that easy processing is obtained while, at the same time, the impregnation cream has high stability.

In the light of the foregoing advantages, the viscosity at 25° C. of the polydimethylsiloxane or polydimethylsiloxanes used in accordance with the invention is preferably in a range from 20 to 350,000 mm$^2$/s and especially in a range from 50 to 80,000 mm2/s. Above a viscosity of more than 80,000 mm$^2$/s, polydimethylsiloxane processing may be impaired, resulting in inhomogenities, thus reducing stability of the impregnation cream. The viscosity is measured according to ISO 3104 of 2020.

To improve the hydrophobic effect of the impregnation cream, an amount of the polydimethylsiloxane, based on the total mass of the impregnation cream, is preferably 50 to 92% by mass, especially 60 to 90% by mass and especially 70 to 88% by mass. If several polydimethylsiloxanes are used in combination, the amounts given herein refer to the total of all polydimethylsiloxanes. Amounts of polydimethylsiloxane above 92% by mass may result in more difficult processability of the polydimethylsiloxanes, while amounts below 50% by mass may be associated with a reduced hydrophobic effect.

Also disclosed according to the invention is a method for preparing an impregnation cream as described above. In this regard, the method comprises a step of mixing the water and the at least one emulsifier until a homogeneous clear mixture is formed. Mixing may be performed simply by shaking or by mixing using a suitable stirrer. After obtaining a homogeneous mixture, admixing of the at least one polydimethylsiloxane is carried out until a homogeneous whitish cream is obtained. In particular, admixing is carried out under the action of a shear force, for example using a rotor-stator agitator. A whitish cream with homogeneous droplet distribution is formed after only a few minutes. Mixing for five minutes with the rotor-stator agitator rotating at 15,000 revolutions produces a particularly stable white cream characterized by a high hydrophobic effect, good workability, user-friendliness and environmental friendliness. The impregnation cream is ready for use immediately after production thereof, showing high rain resistance.

Furthermore, according to the invention, use of the impregnation cream disclosed and produced above for impregnating mineral building materials and especially mineral masonry is also disclosed. Mineral building materials include especially concrete, brick and sandstone. Due to the very good hydrophobicity, easy processability and good application properties, mineral building materials and especially masonry made therefrom can reliably be protected against water penetration or rising water in the long term.

The advantages, beneficial effects and further embodiments described for the impregnation cream according to the invention also apply to the method for producing the impregnation cream according to the invention and to the use of the impregnation cream.

EXAMPLES

In the following, the present invention will further be described with reference to the examples.

Examples—Preparation of Impregnation Creams

Example 1

18.4 g of water and 0.8 g of the emulsifier isotridecyl alcohol-polyglycol ether were weighed into a mixing beaker. It was shaken for about 5 minutes until the droplets disappeared and a clear liquid was obtained.

Then, 35.1 g of a hydroxyl-terminated polydimethylsiloxane having a viscosity of about 50,000 mm$^2$/s at 25° C. (any polydimethylsiloxanes are available, for example, from Gelest) was added.

The mixture was homogenized for 5 minutes at 15,000 rpm using a rotor-stator stirrer from IKA. A low-viscosity milk was formed.

Another 36.3 g of the polydimethylsiloxane was then added and again homogenized for 5 minutes at 15,000 rpm.

Consistency of the impregnation cream became creamy, but still remained flowable.

Finally, another 34.6 g of the polydimethylsiloxane was added and again homogenized for 5 minutes at 15,000 rpm.

A stable, whitish-colored cream was obtained. After storage at room temperature for 12 months, no change of the stable consistency was observed.

Example 2

The method of preparation of Example 1 was repeated, but the dosage of the emulsifier was doubled and the hydroxyl-terminated polydimethylsiloxane having a viscosity of 50,000 $mm^2/s$ was replaced by a hydroxyl-terminated polydimethylsiloxane having lower viscosity of 100 $mm^2/s$ at 25° C.

Again, a stable, whitish-colored cream was obtained. After 12 months of storage at room temperature, no change of the stable consistency was observed.

Example 3

The method of preparation of Example 1 was repeated, but the hydroxyl-terminated polydimethylsiloxane having a viscosity of 50,000 $mm^2/s$ was replaced by a hydroxyl-terminated polydimethylsiloxane having a viscosity of 5,000 $mm^2/s$ at 25° C.

A stable, whitish-colored cream was obtained. After 12 months of storage at room temperature, no change of the stable consistency was observed.

Example 4

An impregnation cream was again prepared as described in Example 1, but the hydroxy-terminated polydimethylsiloxane having a viscosity of 50,000 $mm^2/s$ was replaced by a trimethylsiloxy-terminated polydimethylsiloxane having a viscosity of about 10,000 $mm^2/s$ at 25° C.

Any trimethylsiloxy-terminated polydimethylsiloxanes can be obtained from Thermo Fisher Scientific—Alfa Aesar.

Again, a stable, whitish-colored cream was obtained. After 12 months of storage at room temperature, no change of the stable consistency was observed.

Example 5

The method of preparation of Example 4 was repeated, but the trimethylsiloxy-terminated polydimethylsiloxane having a viscosity of 10,000 $mm^2/s$ was replaced by a trimethylsiloxy-terminated polymer having a viscosity of 50 $mm^2/s$ at 25° C.

Again, a stable, whitish-colored cream was obtained. After 12 months of room temperature storage, no change of the stable consistency was observed.

Examples—Applicability of Impregnation Creams

Example A: Coating of Brickstones 5 brickstones having the dimensions of 20.5 cm×13.5 cm×5.5 cm were coated using the impregnation creams of Examples 1 to 5.

For this purpose, a rectangle having side lengths of 10 cm and 8 cm was marked in the center of one surface of each brick (20.5 cm×13.5 cm), with the longer side of the marked rectangle aligned parallel to the longer side of the brickstone.

In each case, 10 g of the impregnation creams of Examples 1 to 5 were applied onto the marked rectangle.

Before application of the impregnation creams, the brickstones had been stored for 2 days on the floor surface (20.5 cm×13.5 cm) immersed in a 1 cm layer of water. Even after application of the impregnation creams, this storage in water was consistently continued.

After a storage period of 2 and 5 weeks, respectively, the bricks were removed from the water bath and cut in half using a hammer and chisel.

Water droplets were pipetted onto the fractured surfaces to evaluate whether the droplets were absorbed by the surface or whether beads were formed that would retain their shape and not be absorbed even during prolonged storage.

The possible formation of water beads was to be considered as an evidence that hydrophobization of the inner area of the brick had taken place.

It was observed that beads were formed at the upper edge, where the coating was applied, and that underneath, on the entire fracture surface, there was flow and absorption of the water pipetted thereon.

The width of the upper bead-forming zone was different for the 5 brickstones.

The width of the upper bead-forming zone was dependent on the coating with the respective cream of Examples 1 to 5 and the duration of water storage as follows.

After two weeks of water storage, the following results were obtained:

- Zone width when coated using the impregnation cream of example 1: 5 mm.
- Zone width when coated using the impregnation cream of example 2: 10 mm.
- Zone width when coated using the impregnation cream of example 3: 5 mm.
- Zone width when coated using the impregnation cream of example 4: 3 mm.
- Zone width when coated using the impregnation cream of example 5: 15 mm.

Following this test, water storage of one half of each cut brickstone was continued. The other half was stored under dry conditions.

After additional water storage of one half of the cut brickstone for another 3 weeks, the brickstone was cut again and water droplets were pipetted onto the respective fracture surfaces.

The following upper zone widths were detected on the fractured surfaces, where water beads formed, wherein, below these bead-forming zones, the water pipetted thereon was again immediately absorbed by the brick surface.

- Zone width when coated using the cream of example 1: 10 mm
- Zone width when coated using the cream of example 2: 15 mm
- Zone width when coating with the cream of example 3: 10 mm
- Zone width when coated using the cream of example 4:10 mm
- Zone width when coated using the cream of example 5: 30 mm After another 6 months of water storage or dry storage, the dimensions of the bead-forming zones turned out to remain unchanged after both dry storage and water storage.

From these results, it can be concluded that by coating the brickstones with the polydimethylsiloxane impregnation creams of the present invention, a water-repellent effect was obtained in the edge zones.

Example B—Coating of Hollow Concrete Blocks

Cube-shaped hollow blocks having an edge length of 19 cm were used for coating with the impregnation creams of Examples 1 to 5.

Four of the six side faces were sealed with a 3.5 cm thick concrete wall, two opposite side faces were open.

The hollow concrete blocks were stored in water while being seated on one of the four concrete walls. The water height was 1 cm, and the duration of water storage was 2 days. The respective hollow block was thus immersed in water with one base plate and with the two opposite side walls 1 cm. The upper top plate remained dry.

Dark coloring of the vertical side walls progressed from the bottom up to a height of approx. 12 cm.

After the 2-day water immersion, the upper cover plate was coated using the impregnation creams of Examples 1 to 5 in a zone width of 6 cm.

The rectangular coating zone with side lengths of 19 and 6 cm was located at the edge of the upper cover plate directly above an underlying side wall. The respective quantity of the impregnation creams applied was approx. 35 g.

Water storage was then continued. After a storage period of 6 months, the respective hollow block was removed from the water bath and evaluated for the original dark coloring of the vertical side walls.

It was found that the dark coloring of the side wall, which had risen from below and was immediately under the coating zone, had decreased from a height of 12 cm to a height of 4 cm downwards.

In addition, there was another dark coloring that extended downward from the top, where the coating was applied to the top sheet, to a sidewall height of 8 cm, the entire sidewall had darkened from the top to a wall height of 8 cm.

The other, opposite side wall was unchanged, darkening only occurred from below to a height of 12 cm.

From this result, it could be concluded that the bottom darkening was caused by rising water and the upper darkening was caused by the impregnation cream applied on top.

To verify the dark colorings, the two vertical side walls were broken out of the hollow block using a hammer and chisel. Water droplets were applied to the fractured surfaces with a pipette.

It was found that water droplets pipetted onto the bottom dark coloring were immediately absorbed and that, in contrast, water droplets pipetted onto the upper dark coloring formed water beads.

From these results, it can be concluded that the impregnation creams penetrate into the concrete body causing a water repellent effect.

The invention claimed is:

1. An impregnation cream comprising:

water, one emulsifier, and at least one polydimethylsiloxane selected from: HO—$(SiMe_2O)_n$—H and $Me_3SiO$—$(SiMe_2O)_n$—$SiMe_3$, wherein n is an integer from 20 to 2500, the impregnation cream being free from hydrocarbons, alkoxylated silanes, alkoxylated siloxanes, additional emulsifiers, and amine group-functionalized siloxanes, wherein a proportion of the polydimethylsiloxane, based on the total mass of the impregnation cream, is 70 to 88 mass %;

wherein the one emulsifier is isotridecyl alcohol polyglycol ether, and wherein an amount of the one emulsifier, based on the total mass of the impregnation cream is 0.4 to 2 mass %.

2. The impregnation cream of claim 1, consisting of:

water, the one emulsifier, and the at least one polydimethylsiloxane selected from: HO—$(SiMe_2O)_n$—H and $Me_3SiO$—$(SiMe_2O)_n$—$SiMe_3$, wherein n is an integer from 20 to 2500, and optionally at least one additive, a total amount of the additives, based on the total mass of the impregnation cream, being less than 3% by mass.

3. The impregnation cream of claim 1, wherein the one emulsifier is an alkoxylated emulsifier having an HLB value of at least 9.

4. The impregnation cream of claim 1, wherein the one emulsifier has an HLB value of at least 10.

5. The impregnation cream of claim 1, wherein n in the formulae shown in claim 1 is an integer from 50 to 1800.

6. The impregnation cream of claim 1, wherein the viscosity of the polydimethylsiloxane at 25° C. is in a range from 20 to 350,000 mm2/s.

7. A method for preparing the impregnation cream of claim 1, comprising the steps of:

mixing the water and the one emulsifier until a homogeneous mixture is formed; and admixing the at least one polydimethylsiloxane into the homogeneous mixture until a homogeneous whitish-colored cream is formed.

8. A method of impregnating mineral building materials, the method comprising applying the impregnation cream of claim 1 to the mineral building materials.

* * * * *